United States Patent [19]

Takahashi

[11] Patent Number: 5,661,579

[45] Date of Patent: Aug. 26, 1997

[54] MANUFACTURING METHOD FOR LIQUID CRYSTAL DISPLAY HAVING MATCHED LIQUID CRYSTAL AND MIM ELEMENT CAPACITANCES FOR ENHANCING CONTRAST RATIO

[75] Inventor: Kotoyoshi Takahashi, Suwa, Japan

[73] Assignee: Seiko Epson Corporation, Tokyo, Japan

[21] Appl. No.: 369,608

[22] Filed: Jan. 6, 1995

Related U.S. Application Data

[63] Continuation-in-part of Ser. No. 193,607, Feb. 8, 1994, abandoned, which is a continuation of Ser. No. 841,935, Feb. 25, 1992, abandoned.

[30] Foreign Application Priority Data

Feb. 25, 1991 [JP] Japan .................................. 3-53374

[51] Int. Cl.$^6$ ................................................ G02F 1/1343
[52] U.S. Cl. .................................. 349/42; 349/51
[58] Field of Search ........................ 257/30; 359/58, 359/60

[56] References Cited

U.S. PATENT DOCUMENTS

| 4,413,883 | 11/1983 | Baraff et al. | 350/334 |
| 4,683,183 | 7/1987 | Ono | 430/20 |
| 4,861,141 | 8/1989 | Nakazawa | 350/336 |
| 4,871,234 | 10/1989 | Suzuki et al. | 359/58 |
| 5,128,784 | 7/1992 | Suzuki et al. | 359/58 |

OTHER PUBLICATIONS

Baraff et al., A 68 Line Multiplexed Liquid Crystal Display Using Metal–Insulator–Metal (MIM) Devices International Electron Devices Meeting Technical Digest, Washington, D.C. USA (Dec. 1980) pp. #707–710.

Primary Examiner—William L. Sikes
Assistant Examiner—James A. Dudak
Attorney, Agent, or Firm—W. Glen Johnson

[57] ABSTRACT

An electro-optical device, such as a liquid crystal display device, that utilizes MIM-type or other nonlinear pixel driver elements having a first conductor, an insulator, and a second conductor, with a ratio of the capacitance or surface area of pixel electrodes to that of the overlapping parts of first and second conductors and an insulator forming the nonlinear driver being set to maximize contrast at normal use temperatures even when these ratios are changed to nearby values. This results in more efficient pixel driving and good display performance without making the capacitance of the nonlinear driver extremely small.

16 Claims, 9 Drawing Sheets

MANUFACTURING METHOD FOR LIQUID CRYSTAL DISPLAY HAVING MATCHED LIQUID CRYSTAL AND MIM ELEMENT CAPACITANCES FOR ENHANCING CONTRAST RATIO

CONTINUING APPLICATION DATA

This is a continuation-in-part application of application Ser. No. 08/193,607, filed Feb. 8, 1994 which is a continuation of application Ser. No. 07/841,935, filed Feb. 25, 1992, both now abandoned.

BACKGROUND OF THE INVENTION

1. Field of the Invention

The present invention relates to electro-optical devices used in liquid crystal and other electro-optical display devices, and more particularly, to electro-optical devices having pixel electrodes and nonlinear pixel driver elements positioned on one of a pair of substrates between which a liquid crystal material is sandwiched.

2. Related Technical Art

Figure 1:
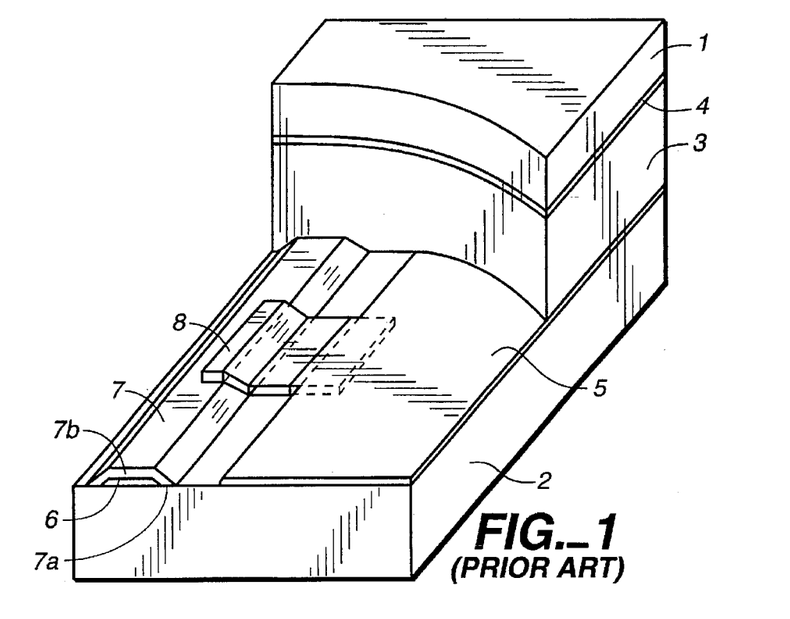
FIG. 1 illustrates a perspective view showing an example of an electrooptical device constructed according to the teachings of the invention.
Figure 2:
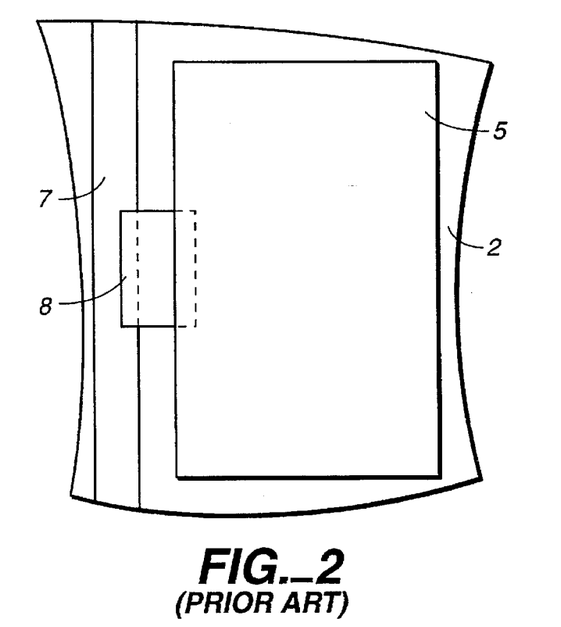
FIG. 2 illustrates a top view of the element substrate employed in FIG. 1.
Figures 3, 4:
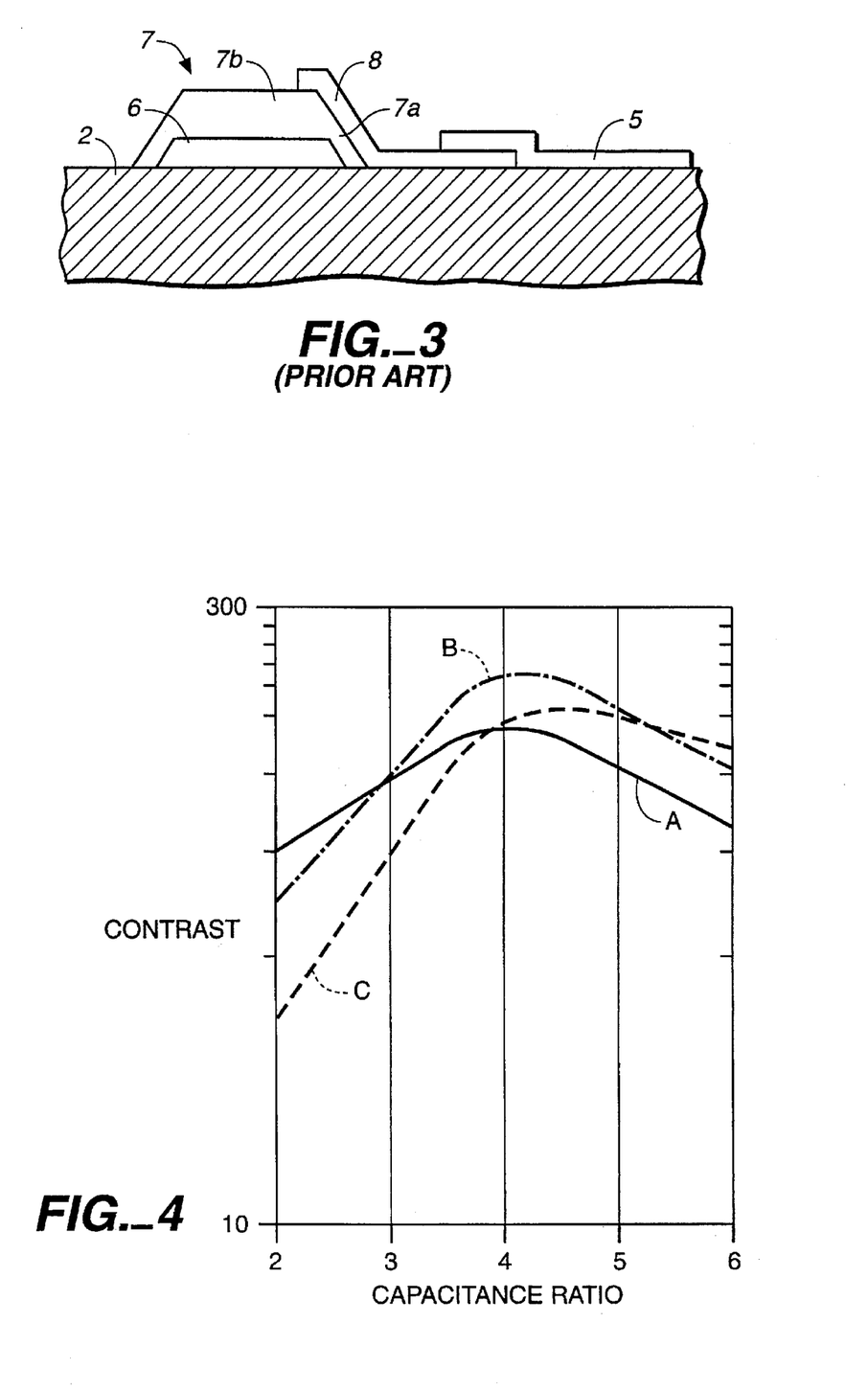
FIG. 3 illustrates an enlarged cross section of the principal parts of the element substrate of FIG. 2.
FIG. 4 presents a graphical representation the change in contrast with respect to capacitance ratio.

Conventional electro-optical devices such as liquid crystal displays often employ metal-insulator-metal (MIM) elements as nonlinear interface or driver elements for each pixel area or electrode. A perspective view of part of a liquid crystal display device using a MIM element in this manner is illustrated in FIG. 1. A top view of a portion of the liquid crystal substrate supporting one MIM element is illustrated in FIG. 2, and an enlarged cross section of this MIM element is shown in FIG. 3.

In these figures, a pair of substrates 1 and 2 are positioned on each side of a liquid crystal layer 3 forming a laminated structure or sandwich. One or more scanning electrodes 4, which are typically made from a transparent layer of material such as ITO, etc., are formed on one substrate, here 1, and a plurality of pixel signal or control electrodes 5, also made from ITO, etc., are formed in a matrix on the other substrate, here 2. Also shown in these figures, is a first conductor 6, typically manufactured from tantalum (Ta), which is covered by an insulator 7 manufactured from a form of tantalum oxide ($TaO_x$), and followed by a second conductor 8 made from chrome (Cr). The overlapping portions of the first and second conductors and the insulator create the active area of a desired MIM element for driving a pixel electrode.

The MIM structure illustrated in these figures is termed a "lateral MIM" structure because only the side surfaces of the first conductor 6 are used in conjunction with the second conductor 8 to form each pixel driver element, that is, as the active element area. In a lateral MIM, the an extermely surfaces of the first conductor 6, i.e., other than the surfaces making up or actively forming the MIM, are covered with an additional, thin, insulator 7b which forms an electrical barrier layer. The electrical resistance of the layer 7b is made larger than that of the thin insulator 7a residing on side surfaces of first conductor 6 to prevent the top surface from interacting with other conductors and functioning as part of a MIM element. This configuration facilitates the manufacture of elements having an extremely small surface area, and has shown to be effective for increasing the density and precision of liquid crystal displays and other electro-optical devices utilizing MIM elements.

In electro-optical devices using MIM and other nonlinear elements such as that described above, where the capacitance of the pixel driver element (MIM) is labeled $C_{MIM}$ and the capacitance of the liquid crystal pixel (LC) driven by the nonlinear element is labeled $C_{LC}$, the voltage impressed on the pixel driver element $V_{ON}$ is expressed by the relationship:

$$V_{ON} = \{C_{LC}/(C_{MIM}+C_{LC})\} \cdot V$$

where V is the applied circuit voltage. The larger the impressed voltage, the better the nonlinear property of the MIM element is utilized and the resistance of the MIM element can be reduced.

Therefore, assuming that the pixel capacitance CLC remains constant, the driver capacitance $C_{MIM}$ must be made small for the MIM element to efficiently drive a pixel with respect to any impressed voltage value. Generally, it is believed desirable that the capacitance ratio $C_{LC}/C_{MIM}$ be set equal to or greater than 10. However, when the driver capacitance $C_{MIM}$ is made small, that is, the size of the element is made small, the resistance of the driver element increases and the effective voltage impressed on the liquid crystal layer decreases when a pixel selection or scanning drive is performed.

What is needed is a method and apparatus for manufacturing an electro-optical device using nonlinear pixel driver elements, such as MIMs, exhibiting good display performance and drive efficiency without requiring the driver element capacitance to be extremely small.

SUMMARY OF THE INVENTION

In order to solve the problems encountered in the art, one purpose of the present invention is to provide an electro-optical device, such as a liquid crystal display device, utilizing MIM-type nonlinear pixel driver elements having a unique capacitance value with respect to the driven pixel which maximizes contrast at normal operating temperatures.

An advantage of the invention is that liquid crystal displays and similar optical devices are produced with improved operating characteristics over given temperature ranges.

Another purpose of the invention is to increase the efficiency of the pixel element driver and, therefore, the overall display apparatus.

Another advantage of the invention is that it provides flexibility in the design of the pixel driver element capacitance or area.

These and other purposes, objects, and advantages are achieved in an electro-optical device comprising pixel electrodes and nonlinear elements for driving the pixel electrodes positioned on one of a pair of substrates with a liquid crystal layer sandwiched in-between and in which an opposing electrode is positioned on the other substrate, and the nonlinear elements have a first conductor, an insulator, and a second conductor, with overlapping portions that have nonlinear current-voltage characteristics, wherein the capacitance ratio of the pixel electrodes to the nonlinear elements is set to maximize contrast at normal use temperatures or within a normal temperature operating range (e.g., 0°–50° C.) even if that capacitance ratio changes as the temperature changes.

As described above, by setting the capacitance ratio so that contrast is maximized at normal use temperatures when the ratio of the capacitance of the pixel electrodes to the capacitance of the overlapping parts of the first and second conductors and insulator forming the nonlinear driver is changed, the nonlinear element efficiently drives the pixel electrode without requiring the capacitance of the nonlinear element to be extremely small, thus making it possible to obtain electro-optical display devices with improved display performance.

In further aspects of the invention, when the first conductor, insulator, and second conductor are made from tantalum, tantalum oxide, and chrome, respectively, the ratio of the capacitance of pixels to that of the overlapping parts forming nonlinear elements is set between about 3.5 and 5.5, more preferably 3.5 and 4.5. In addition, the above capacitance ratio is directly proportional to the ratio of the surface areas of the pixel electrodes and nonlinear elements. For example, when the first conductor, insulator and second conductor are made from tantalum, tantalum oxide and chrome, respectively, as described, the ratio of the surface area of pixels or pixel electrodes to the active surface area of nonlinear elements is preferably set between about 1750 and 2750, more preferably 1750 and 2250.

Other objects and attainments together with a fuller understanding of the invention will become apparent and appreciated by referring to the following description and claims taken in conjunction with the accompanying drawings.

DESCRIPTION OF PREFERRED EMBODIMENTS

The following detailed explanation of an electro-optical device manufactured according to the present invention uses a liquid crystal display device in which MIM elements are used as nonlinear pixel voltage driver elements.

Generally, when MIM elements and other nonlinear two-terminal elements are used to drive pixels or pixel electrodes in liquid crystal display devices, the ratio of the capacitance or the surface area of the pixel electrodes to that of the nonlinear elements is an important design factor. It is generally necessary to set those ratios to prescribed values to achieve a display with acceptable performance characteristics.

For example, the ratio $C_{LC}/C_{MIM}$ of the pixel electrode capacitance $C_{LC}$ to the MIM pixel driver element capacitance $C_{MIM}$ should generally be set to 10 or greater according to the teachings of the current art as described above. However, contrary to conventional teachings, it has been discovered that good display characteristics can actually be obtained without setting or restricting this ratio to a value of 10 or more by the following simulations.

Simulations

The inventor has performed two series of simulations (Simulations 1, 2 and 3, and Simulations 4, 5, 6 and 7) to determine the optimal capacitance ratios which made contrast ratio to be maximized. In these simulations, the effective voltage applied to the liquid crystal ($V_{RMS\ average}$) was compared to the capacitance ratio ($C_{ratio}$) and the margin of ON voltage—OFF voltage ($V_{RMS\ ON-OFF}$: which corresponds to the contrast ratio) was also compared to the capacitance ratio ($C_{ratio}$). The range of the capacitance ratio ($C_{ratio}$) was from 1 to 7 for the applied voltage $V_B$=10, 15, 20, 25, 30, 35 and 40 V.

Simulations 1–3

One series of simulations were performed at 25° C. under the following three conditions.

Simulation 1

Figure 5:
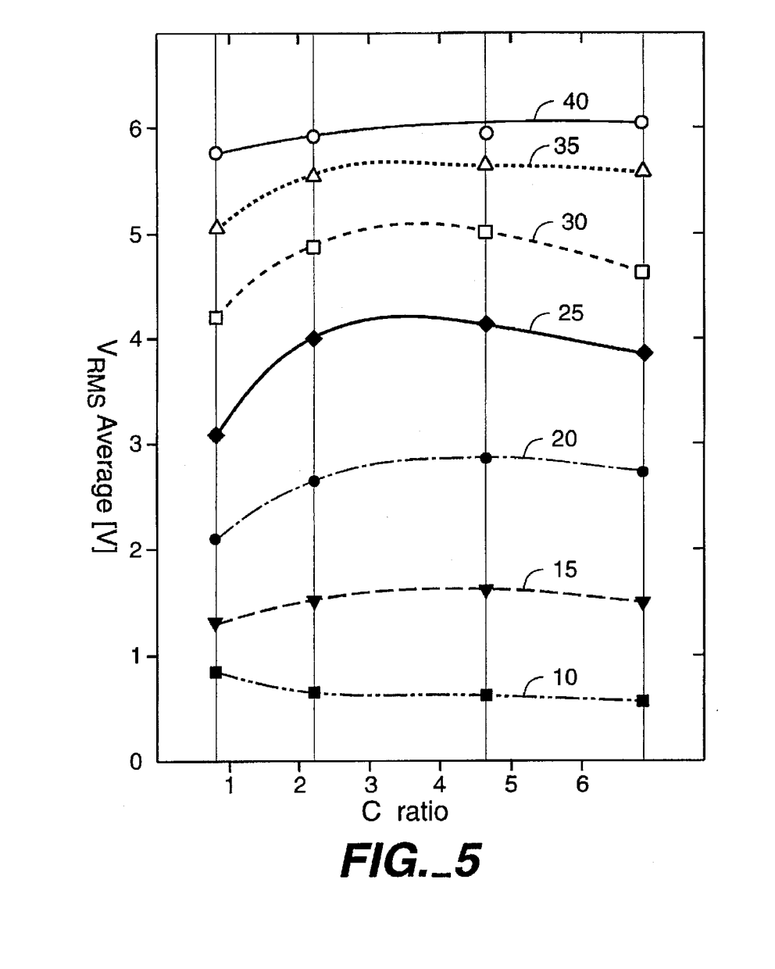
FIG. 5 is a graph of $V_{RMS\ average}$ versus $C_{ratio}$ and FIG. 6 is a graph of $V_{RMS\ ON-OFF}$ versus $C_{ratio}$ having the anode oxidation voltage set to 30 V with a pulse height of 25% and a bias of 100%.
Figure 6:
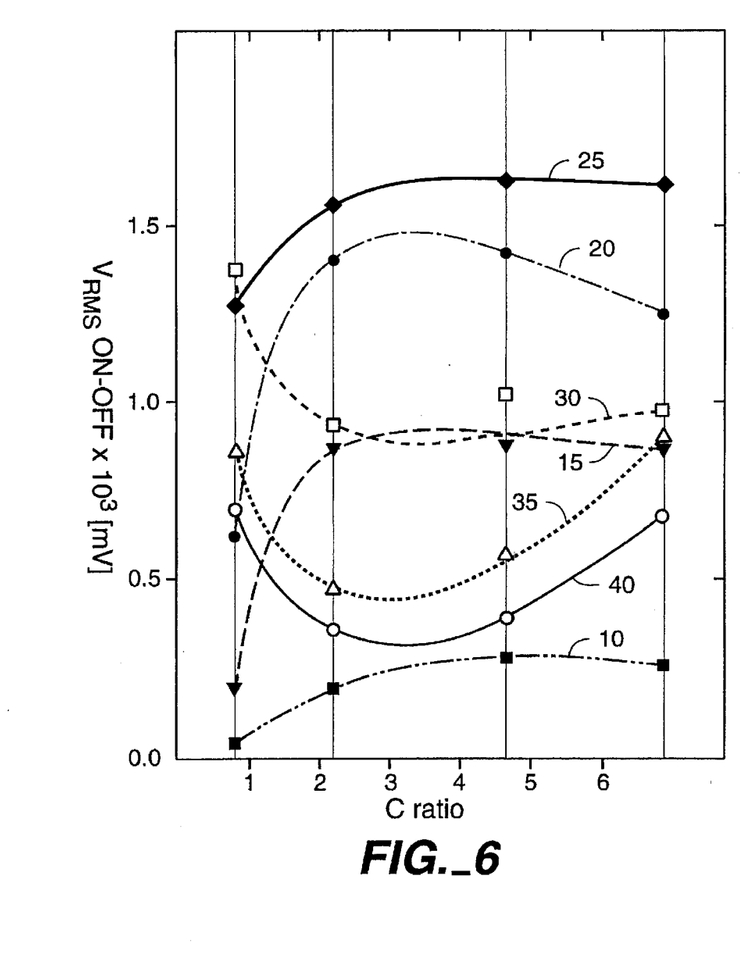

In FIGS. 5 and 6, the anode oxidation voltage was set to 30 V with a pulse height of 25% and a bias of 100%. FIG. 5 illustrates $V_{RMS\ average}$ versus the capacitance ratio $C_{ratio}$ and FIG. 6 illustrates the $V_{RMS\ ON-OFF}$ versus the capacitance ratio $C_{ratio}$.

Simulation 2

Figure 7:
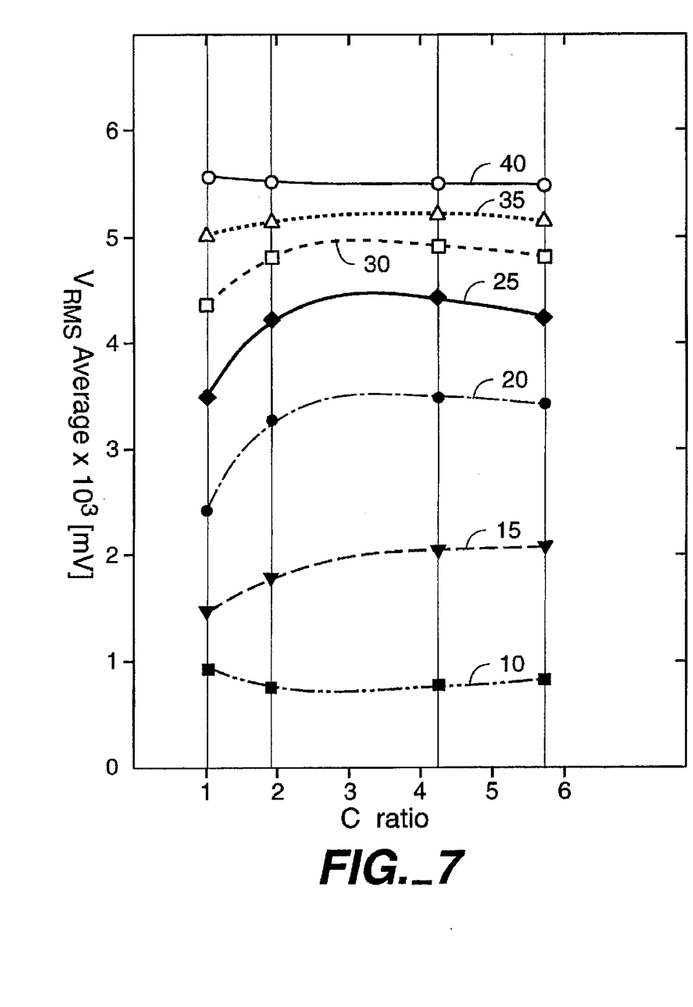
FIG. 7 is a graph of $V_{RMS\ average}$ versus $C_{ratio}$ and FIG. 8 is a graph of $V_{RMS\ ON-OFF}$ versus having an anode oxidation voltage set to 25 V with a pulse height of 25% and a bias of 100%.
Figure 8:
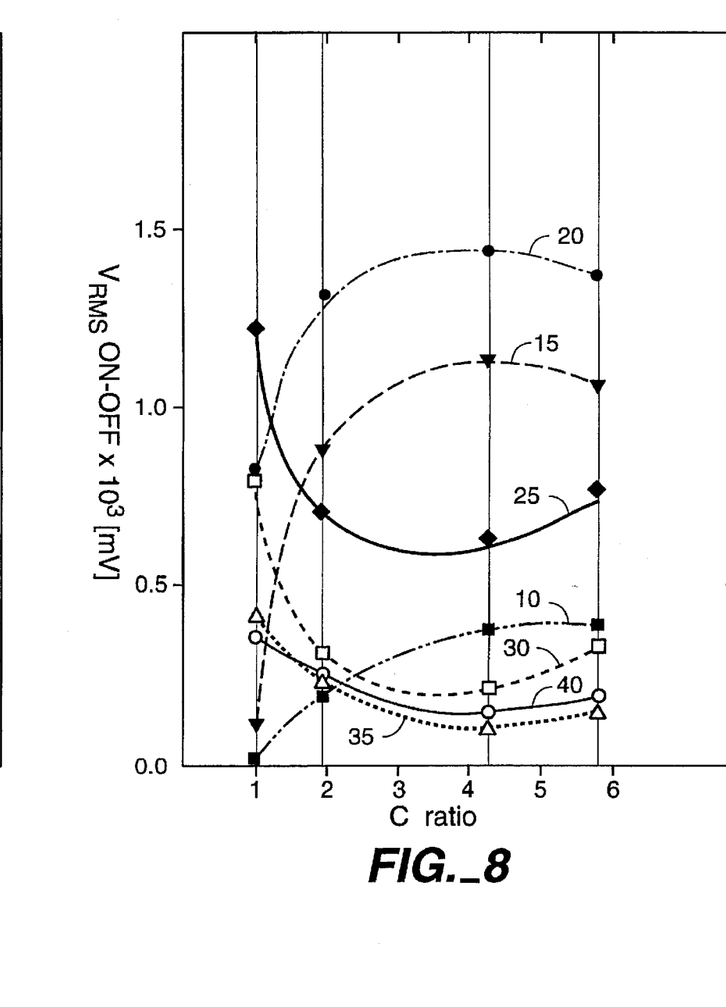

In the second simulation, as shown in FIGS. 7 and 8, the anode oxidation voltage was set 25 V with a pulse height of 25% and a bias of 100%. The difference in anode oxidation voltage in the second simulation is associated with the change in the thickness of the I layer (insulator layer) of the MIM device. A higher voltage corresponds to a thicker insulator layer. FIG. 7 illustrates $V_{RMS\ average}$ versus $C_{ratio}$, and FIG. 8 illustrates $V_{RMS\ ON-OFF}$ versus $C_{ratio}$.

Simulation 3

Figure 9:
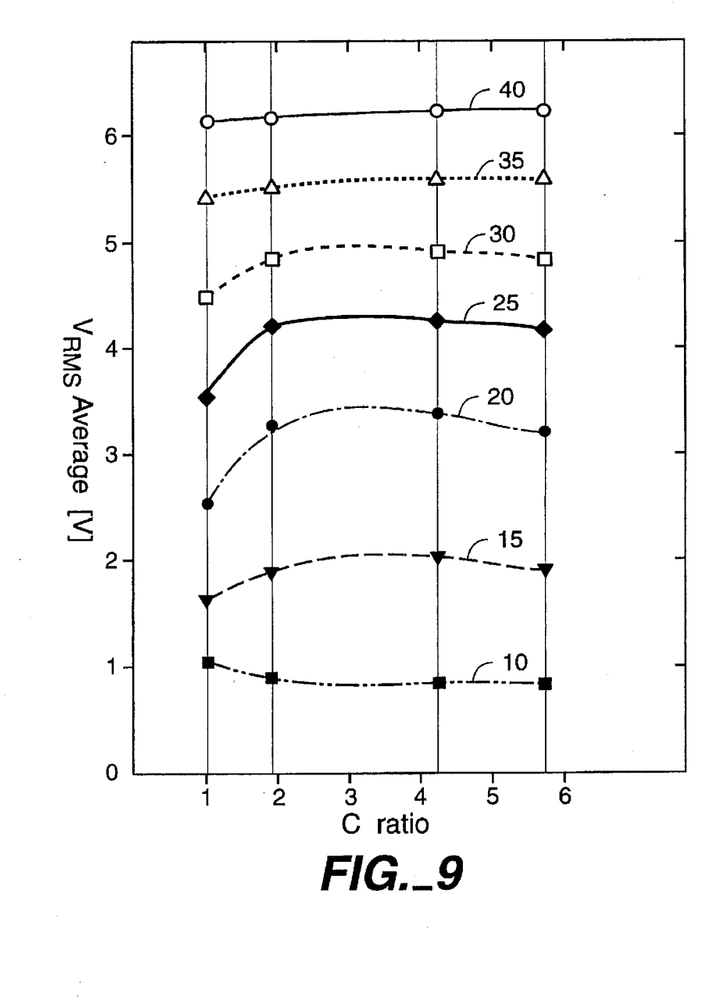
FIG. 9 is a graph of $V_{RMS\ average}$ versus $C_{ratio}$ and FIG. 10 is a graph of $V_{RMS\ ON-OFF}$ versus $C_{ratio}$ having an anode oxidation voltage set to 30 V with a pulse height of 30% and a bias of 100%.
Figure 10:
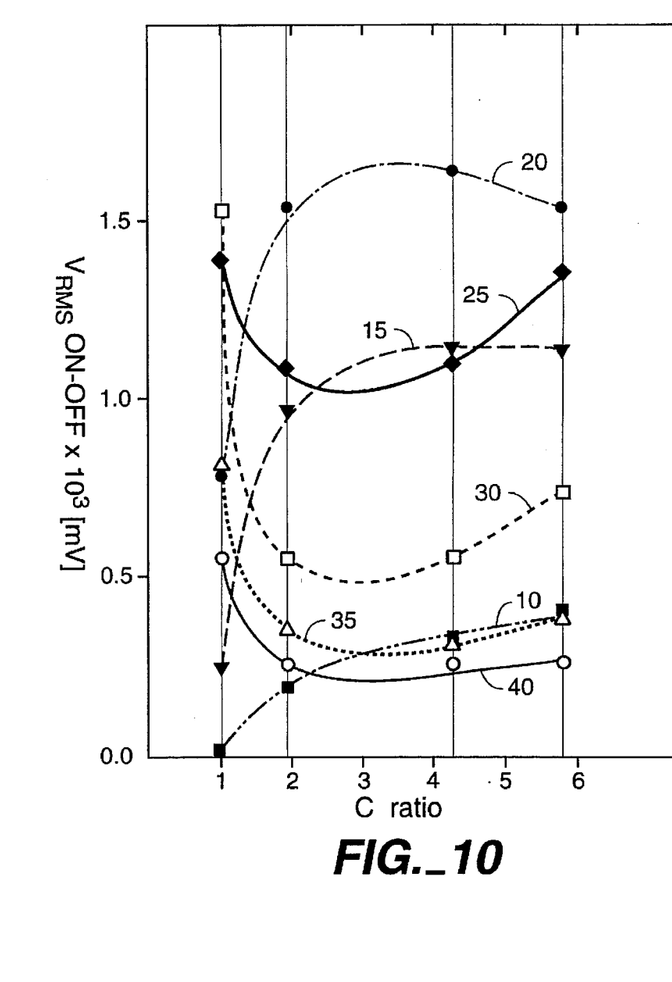

In the third simulation, the anode oxidation voltage was set to 30 V with a pulse height of 30% and a bias of 100%. In this example, the difference in pulse height corresponds to a difference between blackness and whiteness. A larger pulse gives rise to a more distinguished difference between a black state and a white state. FIG. 9 illustrates $V_{RMS\ average}$ versus $C_{ratio}$ and FIG. 10 illustrates $V_{RMS\ ON-OFF}$ versus $C_{ratio}$. In the above simulations, the inventor has observed that both $V_{RMS\ average}$ (which corresponds to the effect voltage applied to the liquid crystal) and $V_{RMS\ ON-OFF}$ (which corresponds to the contrast ratio) have an extremum which appears in the region of a capacitance ratio of between 3 and 5.5, more preferably 3.5 and 4.5, and they are stable in that region. On the other hand, both $V_{RMS\ average}$ and $V_{RMS\ ON-OFF}$ exhibit a large variation below the capacitance ratio of 2.

Simulation 4–7

Figure 11:
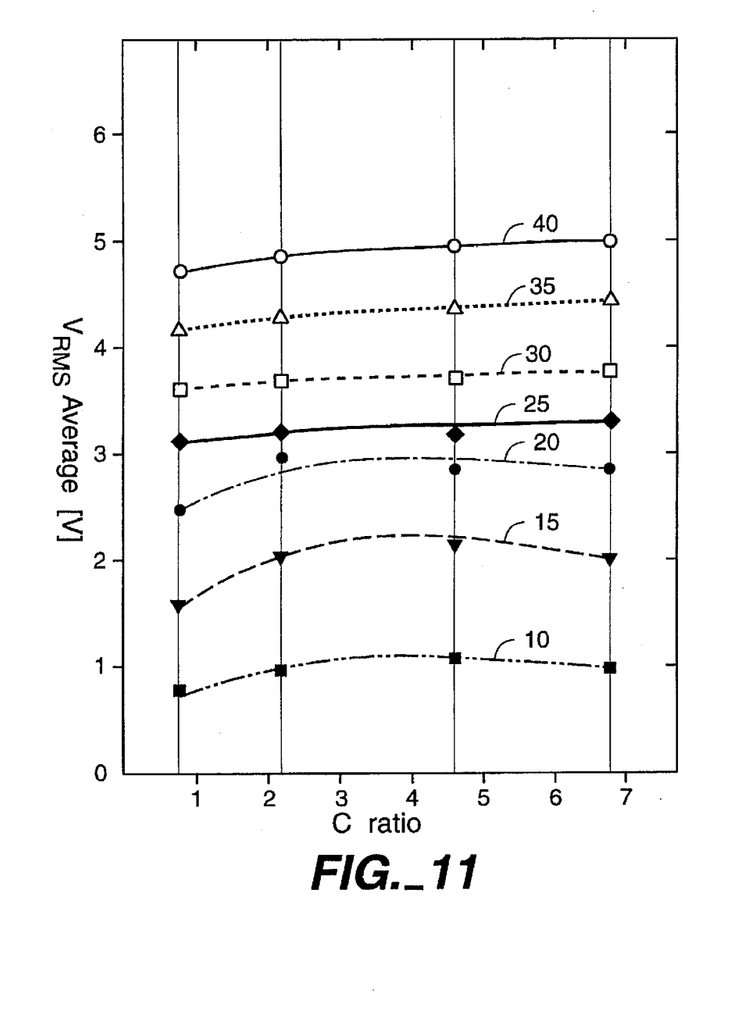
FIG. 11 is a graph of $V_{RMS\ average}$ versus $C_{ratio}$ and FIG. 12 is a graph of $V_{RMS\ ON-OFF}$ versus $C_{ratio}$ at 60° C.
Figure 12:
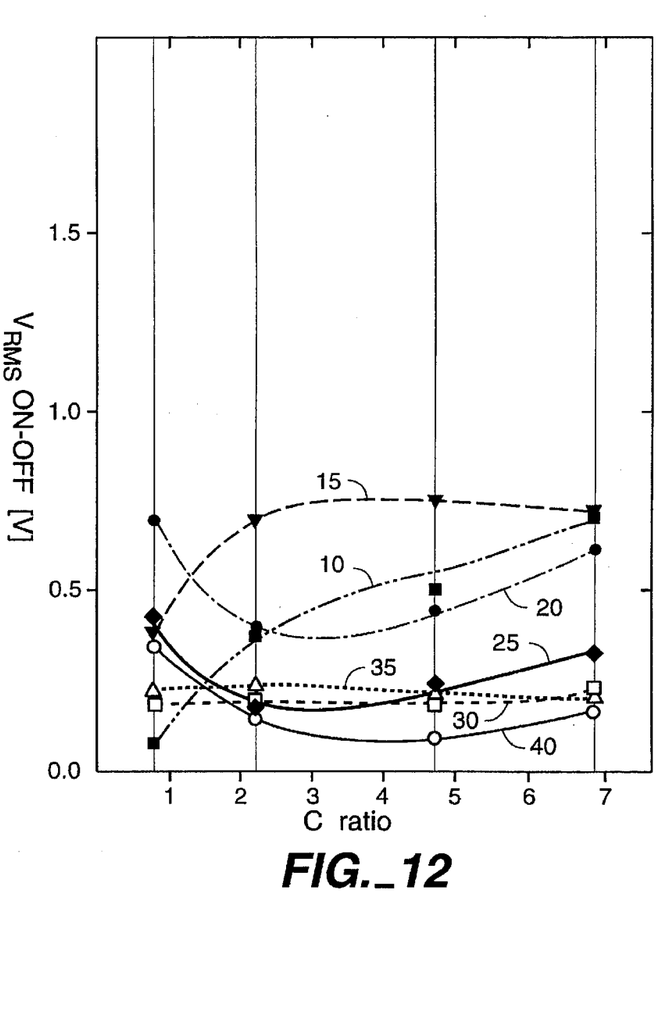
Figure 13:
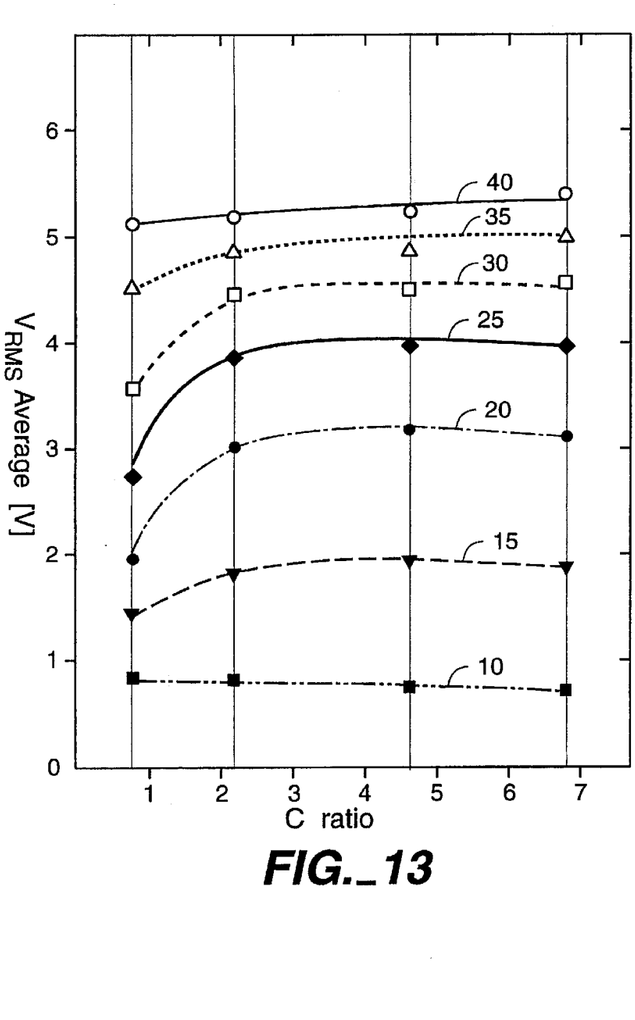
FIG. 13 is a graph of $V_{RMS\ average}$ versus $C_{ratio}$ and FIG. 14 is a graph of $V_{RMS\ ON-OFF}$ versus $C_{ratio}$ at 40° C.
Figure 14:
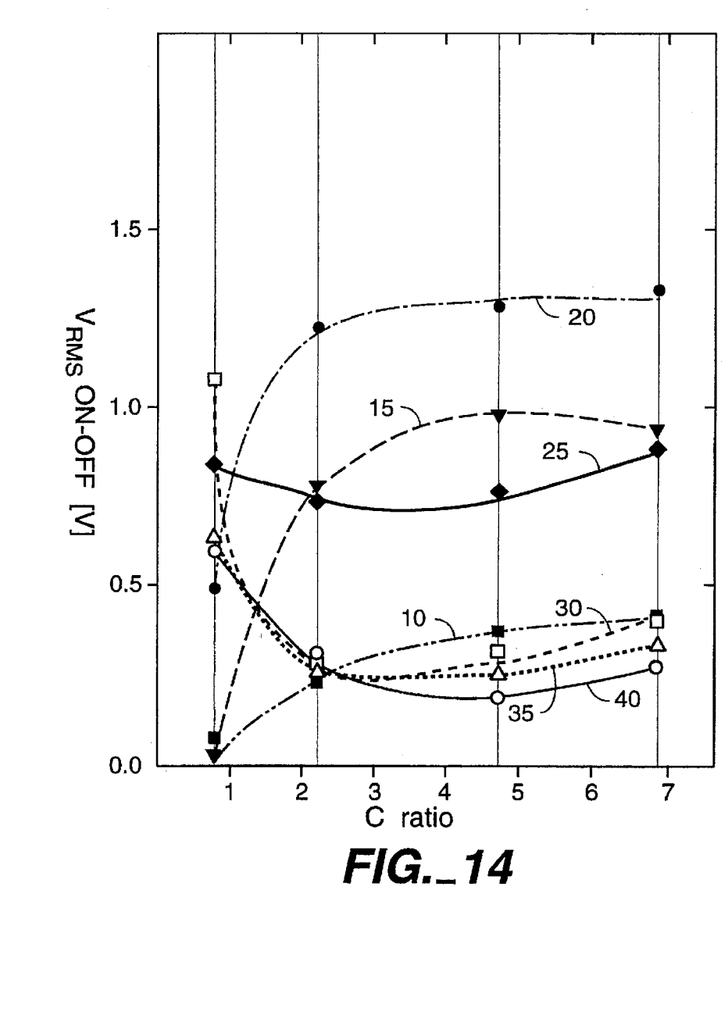
Figure 15:
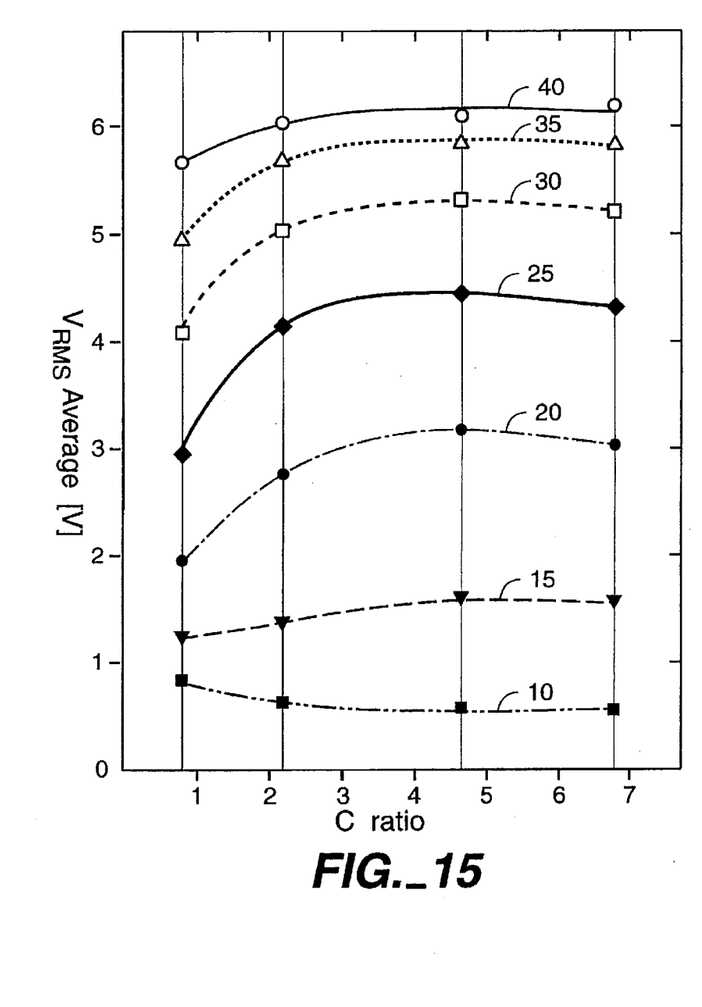
FIG. 15 is a graph of $V_{RMS\ average}$ versus $C_{ratio}$ and FIG. 16 is a graph of $V_{RMS\ ON-OFF}$ versus $C_{ratio}$ at 20° C.
Figure 16:
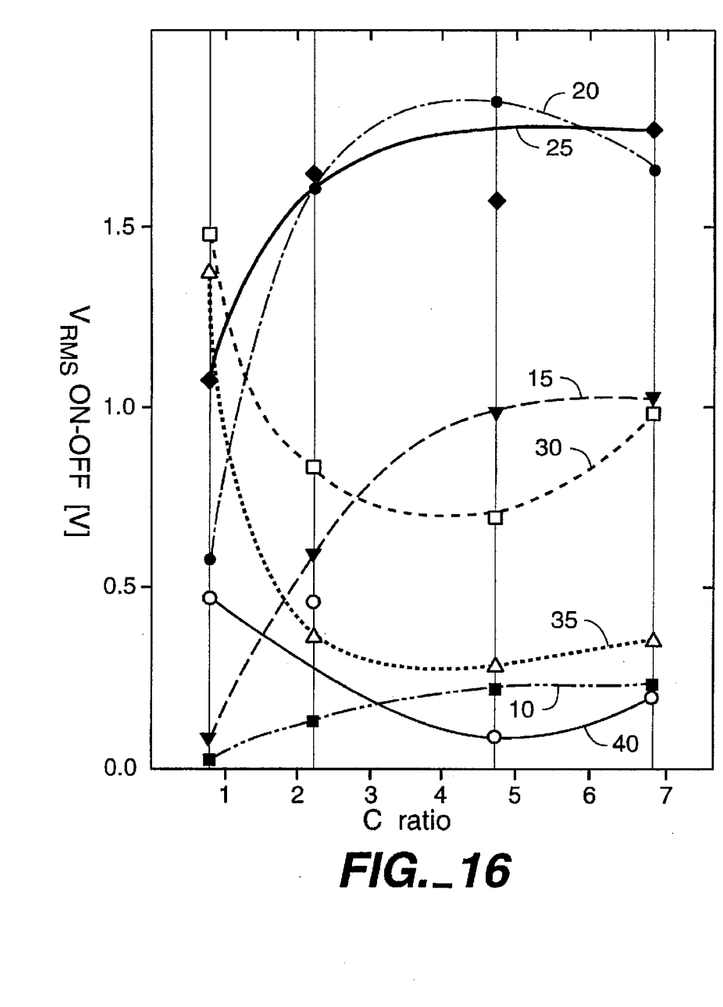
Figure 17:
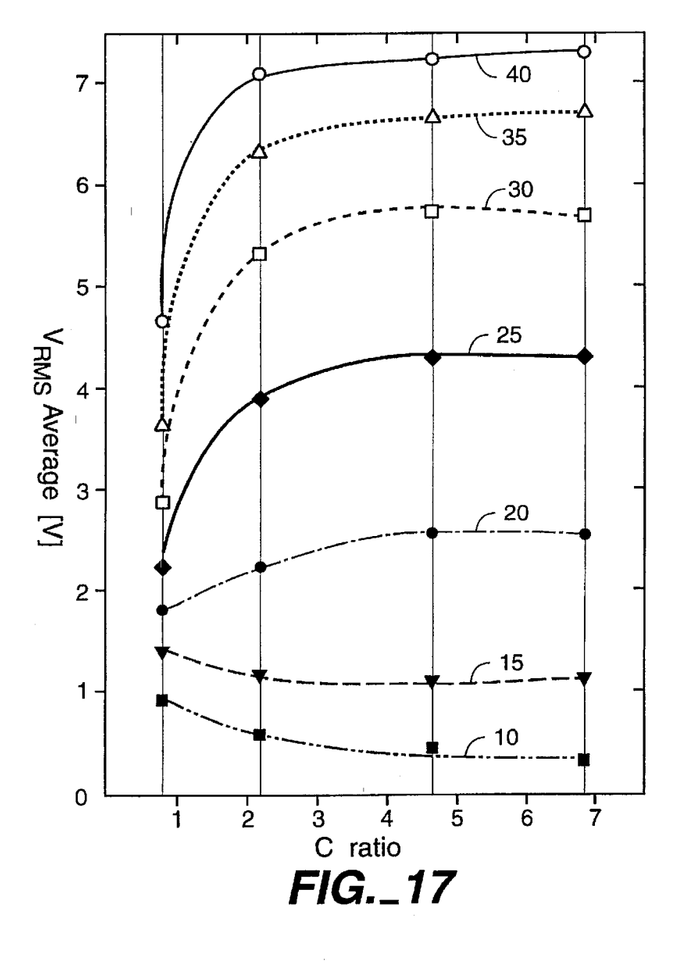
FIG. 17 is a graph of $V_{RMS\ average}$ versus $C_{ratio}$ and FIG. 18 is a graph of $V_{RMS\ ON-OFF}$ versus $C_{ratio}$ at 0° C.
Figure 18:
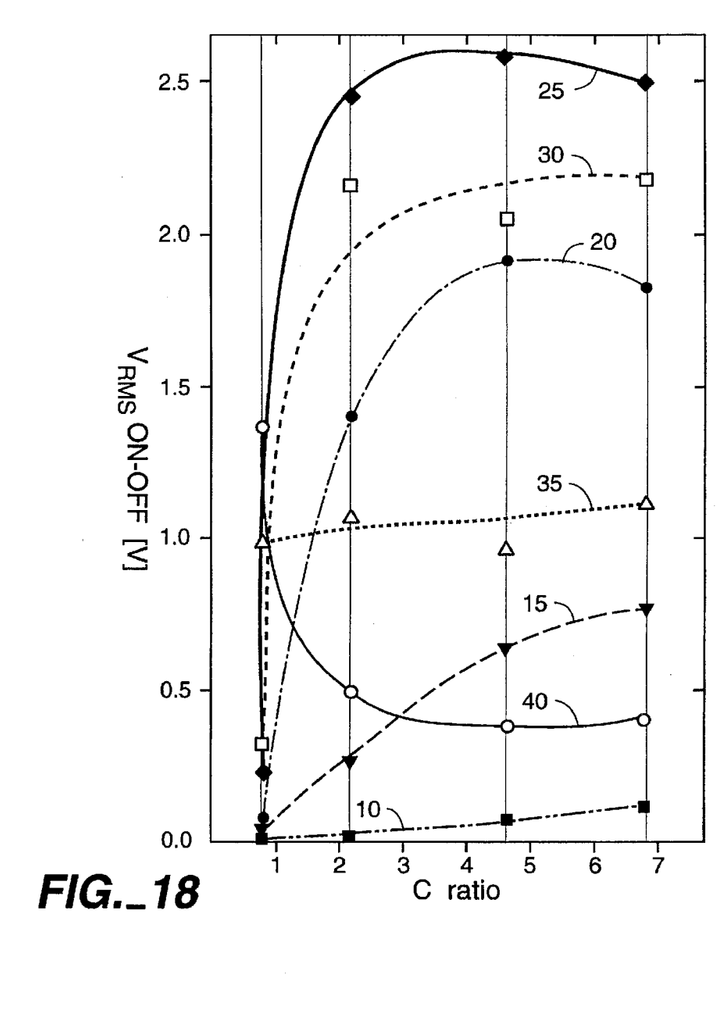

The other series of simulations were performed at different temperatures of 60° C. (Simulation 4), 40° C. (Simulation 5), 20° C (Simulation 6) and 0° C. (Simulation 7) under the condition of the anode oxidation voltage 30 V, pulse height 25% and bias 100%. The results are shown in FIGS. 11 and 12 (Simulation 4), FIGS. 13 and 14 (Simulation 5), FIGS. 15 and 16 (Simulation 6), and FIGS. 17 and 18 (Simulation 7).

As illustrated in those figures, the stable points lie between capacitance ratio ($C_{ratio}$) of 3 and 5.5, more preferably 3.5 and 4.5 as well as the case of Simulations 1 to 3.

In view of the foregoing simulations, if the capacitance ratio is set to be between 3 and 5.5, more preferable 3.5 and 4.5, a small variation of the size of the pixel driver element (MIM) or liquid crystal pixel in practical production causes little effect on the contrast ratio in any amount of effective voltage. Further, the temperature dependence also seems to be small for the capacitance ratio in this region.

FIG. 4 shows the contrast (ratio of transmitted light for the ON and OFF pixel operating modes) with respect to the capacitance ratio in the liquid crystal display device of FIGS. 1 through 3 in which the first conductor, insulator, and second conductor, which make up the MIM element, are made from tantalum, a form of tantalum oxide ($TaO_x$), and chrome, respectively, the relative dielectric constant and film thickness of the tantalum oxide are set to 27 and 60 nm, respectively, and an approximately 5 μm thick liquid crystal layer is sandwiched between the opposing electrode substrates. It can be seen from the figure that a good level of contrast (ratio) is obtained at a capacitance ratio ($C_{LC}/C_{MIM}$) of between 3.5 and 5.5. The same results are obtained when the relative dielectric constant and thickness of the insulating $TaO_x$ film are changed slightly.

Also in FIG. 4, the curves A, B, and C show respective contrast levels for 0° C., 25° C., and 50° C. operating temperatures, indicating that the capacitance ratio at which contrast is maximized does not change greatly due to changes in the temperature within the normal-use temperature range 0° C. to 50° C. Therefore, a consistently high contrast display or high contrast levels are obtained by setting the capacitance ratio to the values described above.

Furthermore, because of their directly proportional relationship, the above capacitance ratio can be replaced by the ratio of the surface area of the pixel, i.e., surface area of the pixel electrode, to the surface area of the nonlinear element (referred to as "drive area ratio" below).

The reason is explained in detail below.

Operating characteristics of nonlinear elements typified by MIM structures are dependent on the Schottky or Poole Frenkel effects, and the current density j is expressed by the relationship:

$$j = kV_{exp}(\beta \sqrt{V}) \quad (1)$$

where:

$$\beta = 1/\alpha KT(q^3/\pi \epsilon_r \epsilon_0 d)^{1/2} \quad (2)$$

$$k = \eta \mu q/d_{exp}(-\phi/\alpha KT) \quad (3)$$

and k is Boltzmann's constant; V is the applied voltage; q is electronic charge; $\epsilon_r \epsilon_0$ is the permittivity of the insulator; d is the film thickness of the insulator; η is electron concentration; μ is mobility and α is valued at 1 for the Poole-Frenkel effect and 2 for the Schottky effect.

For example, in the case of a MIM type pixel driver element made from a tantalum conductor, an insulating $TaO_x$ film with a thickness of 60 nm, and a relative dielectric constant of 27, and a second conductive layer of chrome, a value of 4 to 8 is obtained for β from equation (2), which indicates the steepness of the nonlinear characteristics of the nonlinear element. In addition, the element capacitance $C_{MIM}$ in this case is expressed by the relationship:

$$C_{MIM} = \epsilon_r \epsilon_0 S/d \quad (4)$$

where S is the element surface area, and the element capacitance is regulated by its surface area.

When these nonlinear MIM-type pixel driving elements are used in liquid crystal optical devices, the capacitance ratio $C_{LC}/C_{MIM}$ of the pixel capacitance $C_{LC}$ and the element capacitance $C_{MIM}$ has an optimum value for achieving the best display performance (contrast, gradation reproduction, etc.) as described above. The optimism capacitance ratio in that case is between 3.5 and 5.5 more preferably 3.5 and 4.5 and the corresponding drive area ratio is between 1750 to 2750, more preferably 1750 and 2250. Since the element capacitance $C_{MIM}$ is dependent on the element surface area S, the average value of the optimum current during writing, I', with an average voltage $V_{ON}$ impressed on the element, and the element surface area S' at which the capacitance ratio (capacitance) becomes optimal, are related by the expression:

$$I' = j(V_{ON})S' \quad (5)$$

from equation (1).

Since j increases according to equation (1) when β, which indicates the steepness of the element, increases, then according to equation (5), the optimum element surface area S' or the average voltage $V_{ON}$ impressed on the driver element must be made small in order to obtain the optimum current average I'.

Also, since the steepness β of the element is expressed as $$\beta = \sqrt{(1/\epsilon_r d)} \quad (6)$$

the optimum element size fluctuates due to changes in the relative dielectric constant $e_r$ or film thickness d of the insulator of the nonlinear element and these factors need to be taken into account when selecting design values.

In the example illustrated in the figures, a lateral MIM structure was used as the nonlinear pixel driver, but the disclosure of the present invention is not limited to this single type of structure. Other types of nonlinear pixel drivers can be employed within the teachings of the invention provided the capacitance ratio, and appropriate active element area ratios, are used. In addition, for purposes of clarity an exemplary embodiment was used in which tantalum, $TaO_x$, and chrome were used as the first conductor, insulator, and second conductor for the MIM element, but regardless of the materials used, and as long as they are suitable, the some effect is obtained by setting the capacitance ratio or the drive area ratio so that contrast is maximized at normal use temperatures when the capacitance ratio or drive area ratio is changed. In addition, the exemplary embodiment used a liquid crystal display device, but the invention is also applicable to other types of liquid crystal devices and other electro-optical devices.

As described above, by using the technique of the invention, the capacitance ratio or the surface area ratio is set so that contrast is maximized at normal use temperatures when the capacitance ratio or the surface area ratio of the pixel electrodes to the nonlinear elements is a little changed in practical production. This results nonlinear elements that drive the pixels in a display device more efficiently without making the capacitance of the elements extremely small, thus making it possible to obtain electro-optical display devices with good performance and stability.

While the invention has been described in conjunction with several specific embodiments, it is evident to those skilled in the art that many further alternatives, modifications and variations will be apparent in light of the forgoing description. Thus, the invention described herein is intended to embrace all such alternatives, modifications, applications and variations as may fall within the spirit and scope of the appended claims.

What is claimed is:

1. A method for manufacturing a liquid crystal display, including first and second opposing substrates sandwiching a liquid crystal medium, comprising the steps of:

forming a nonlinear element of a first capacitance on the first substrate; and forming a pixel element of a second capacitance including a pixel electrode positioned adjacent the liquid crystal medium and in electrical communication with the nonlinear element, wherein display contrast of the liquid crystal display is a function of a capacitance ratio between the first and second capacitances, the function being mapped according to first, second and third capacitance ratio ranges, the first and second ranges defining respective first and second non-peak display contrast regions and the third range defining an intervening peak display contrast region greater than the first and second contrast regions; and selecting the first and second capacitances according to the third range of capacitance ratios to impart a maximum display contrast.

2. The manufacturing method of claim 1, wherein said nonlinear element forming step comprises:

forming a first conductor on the first substrate;

patterning an insulator on the first conductor; and disposing a second conductor on the insulator to form respective regions of mutual overlap, the overlap regions collectively exhibiting a nonlinear current voltage characteristic.

3. The manufacturing method of claim 1, wherein the third range of capacitance ratios is from 3.5 to 5.5.

4. The manufacturing method of claim 2, wherein the first and second conductors of the nonlinear element formed in said nonlinear element forming step element respectively comprise tantalum and chrome.

5. The manufacturing method of claim 2, wherein the insulator of the nonlinear element formed in said nonlinear element forming step comprises $TaO_x$.

6. The manufacturing method of claim 1, wherein said nonlinear element forming step comprises:

forming a first conductor on the first substrate;

oxidizing a portion of the first conductor to form an insulator thereon; and disposing a second conductor on the insulator to form respective regions of mutual overlap, the overlap regions collectively exhibiting a nonlinear current voltage characteristic.

7. The manufacturing method of claim 6, wherein the first and second conductors of the nonlinear element formed in said nonlinear element forming step element respectively comprise tantalum and chrome.

8. The manufacturing method of claim 6, wherein the insulator of the nonlinear element formed in said nonlinear element forming stop comprises $TaO_x$.

9. The manufacturing method of claim 1, wherein said nonlinear element forming step comprises:

forming a first conductor on the first substrate;

forming an insulator on the first conductor; and disposing a second conductor on the insulator to form respective regions of mutual overlap, the overlap regions collectively exhibiting a nonlinear current voltage characteristic.

10. The manufacturing method of claim 9, wherein the first and second conductors of the nonlinear element formed in said nonlinear element forming step element respectively comprise tantalum and chrome.

11. The manufacturing method of claim 9, wherein the insulator of the nonlinear element formed in said nonlinear element forming step comprises $TaO^x$.

12. A method for manufacturing a liquid crystal display including first and second opposing substrates sandwiching a liquid crystal medium, comprising the steps of:

forming a nonlinear element having a first capacitance on the first substrate, comprising the steps of:

forming a first conductor on the first substrate;

patterning an insulator on the first conductor; and disposing a second conductor on the insulator to form respective regions of mutual overlap, the overlap regions collectively exhibiting a nonlinear current voltage characteristic;

forming a pixel element including a pixel electrode having a surface area and a second capacitance dependent thereon, the pixel electrode being positioned adjacent the liquid crystal medium and in electrical communication with the nonlinear element, wherein display contrast of the liquid crystal display is a function of a ratio between the first and second capacitances, the function being mapped according to first, second and third capacitance ratio ranges, the first and second ranges defining respective first and second non-peak display contrast regions and the third range defining an intervening peak display contrast region greater than the first and second contrast regions;

selecting a desired ratio between the first and second capacitances among the third range of capacitance ratios to impart a maximum display contrast; and adjusting a dimensional ratio between the surface area of the pixel electrode formed in said pixel element forming step and the overlap regions of the nonlinear element formed in said nonlinear element forming step to achieve the desired capacitance ratio selected in said selecting step.

13. The manufacturing method of claim 12, wherein the third range of capacitance ratios is from 3.5 to 5.5.

14. The manufacturing method of claim 12, wherein the first and second conductors of the nonlinear element formed in said nonlinear element forming step element respectively comprise tantalum and chrome.

15. The manufacturing method of claim 12, wherein the insulator of the nonlinear element formed in said nonlinear element forming step comprises $TaO_x$.

16. The manufacturing method of claim 12, wherein the dimensional ratio adjusted in said adjusting step ranges from 1750 to 2750.

* * * * *

UNITED STATES PATENT AND TRADEMARK OFFICE
CERTIFICATE OF CORRECTION

PATENT NO.    : 5,661,579
DATED         : August 26, 1997
INVENTOR(S)   : Kotoyoshi Takahashi It is certified that errors appear in the above identified patent and that said Letters Patent is hereby corrected as shown below:

Column 7, line 53, change "stop" to --step--.

Column 8, line 11, change "TaO$^x$ to --TaO$_x$--.

Signed and Sealed this

Ninth Day of December, 1997

BRUCE LEHMAN

Attest:

Attesting Officer

Commissioner of Patents and Trademarks